(12) United States Patent
Bosch

(10) Patent No.: US 11,267,507 B2
(45) Date of Patent: Mar. 8, 2022

(54) WHEEL SUPPORT FOR A MOTOR VEHICLE

(71) Applicant: AUDI AG, Ingolstadt (DE)

(72) Inventor: Jakob Bosch, Bad Waldsee (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/045,255

(22) PCT Filed: Mar. 28, 2019

(86) PCT No.: PCT/EP2019/057875
§ 371 (c)(1),
(2) Date: Oct. 5, 2020

(87) PCT Pub. No.: WO2019/201566
PCT Pub. Date: Oct. 24, 2019

(65) Prior Publication Data
US 2021/0171095 A1 Jun. 10, 2021

(30) Foreign Application Priority Data

Apr. 19, 2018 (DE) .................. 10 2018 205 996.9

(51) Int. Cl.
*B62D 7/16* (2006.01)
*B62D 7/18* (2006.01)
*F16C 11/06* (2006.01)

(52) U.S. Cl.
CPC .............. *B62D 7/166* (2013.01); *B62D 7/18* (2013.01); *F16C 11/0695* (2013.01); *F16C 2326/05* (2013.01)

(58) Field of Classification Search
CPC ....... B62D 7/166; B62D 7/18; F16C 11/0695; F16C 2326/05; F16C 2326/02;
(Continued)

(56) References Cited

U.S. PATENT DOCUMENTS 6,308,970 B1 10/2001 Stuart
6,974,141 B2 * 12/2005 Kim .................. B62D 7/18
280/93.512
(Continued)

FOREIGN PATENT DOCUMENTS

CN 2108665 U 7/1992
CN 106904215 A 6/2017
(Continued)

OTHER PUBLICATIONS

Examination Report dated Oct. 21, 2019 in corresponding German application No. 10 2018 205 996.9; 14 pages.
(Continued)

*Primary Examiner* — Darlene P Condra
(74) *Attorney, Agent, or Firm* — Maier & Maier, PLLC

(57) ABSTRACT

A wheel support for a motor vehicle, including a main part and a track lever extending from the main part for attaching a track rod via a track rod joint, wherein the track rod joint is fixed or can be fixed to the track lever at an attachment point by a pin on one side of the track lever. A holding protrusion which covers the attachment point forms a securing means for the track rod on the wheel support. The disclosure additionally relates to a method for mounting a wheel support for a motor vehicle.

20 Claims, 1 Drawing Sheet

(58) Field of Classification Search
CPC ......... B60G 2204/43; B60G 2206/016; B60G 2600/08; B60G 7/005; B60G 2200/44; B60G 2204/416; B60G 2204/4308; B60G 2206/50; B60B 35/003
See application file for complete search history.

(56) References Cited

U.S. PATENT DOCUMENTS

| | | | | |
|---|---|---|---|---|
| 7,527,294 | B2* | 5/2009 | Porter | B62D 1/195 |
| | | | | 280/777 |
| 9,283,988 | B1* | 3/2016 | Ramoutar | B62D 7/228 |
| 2008/0129005 | A1* | 6/2008 | Hilmann | B62D 7/06 |
| | | | | 280/124.1 |
| 2015/0102592 | A1* | 4/2015 | Kerstan | B62D 21/152 |
| | | | | 280/784 |
| 2021/0138833 | A1* | 5/2021 | Bosch | B60T 5/00 |

FOREIGN PATENT DOCUMENTS

| | | |
|---|---|---|
| DE | 40 17 210 C1 | 10/1991 |
| DE | 103 46 280 A1 | 5/2005 |
| DE | 10 2005 011 135 A1 | 9/2005 |
| DE | 11 2009 001 768 T5 | 5/2011 |
| DE | 10 2011 007 831 A1 | 10/2012 |
| DE | 10 2013 012 273 A1 | 1/2015 |
| DE | 10 2013 214 719 A1 | 1/2015 |
| DE | 10 2014 003 453 B3 | 7/2015 |
| DE | 10 2015 112 509 A1 | 2/2017 |

OTHER PUBLICATIONS

International Search Report dated Jul. 3, 2019 in corresponding International application No. PCT/EP2019/057875; 7 pages.

Written Opinion of the International Searching Authority dated Jul. 3, 2019 in corresponding International application No. PCT/EP2019/057875; 13 pages including Machine-generated English-language translation.

Notification of Transmittal of Translation of the International Preliminary Report on Patentability dated Oct. 29, 2020, in connection with corresponding international application No. PCT/EP2019/057875 (8 pages).

* cited by examiner

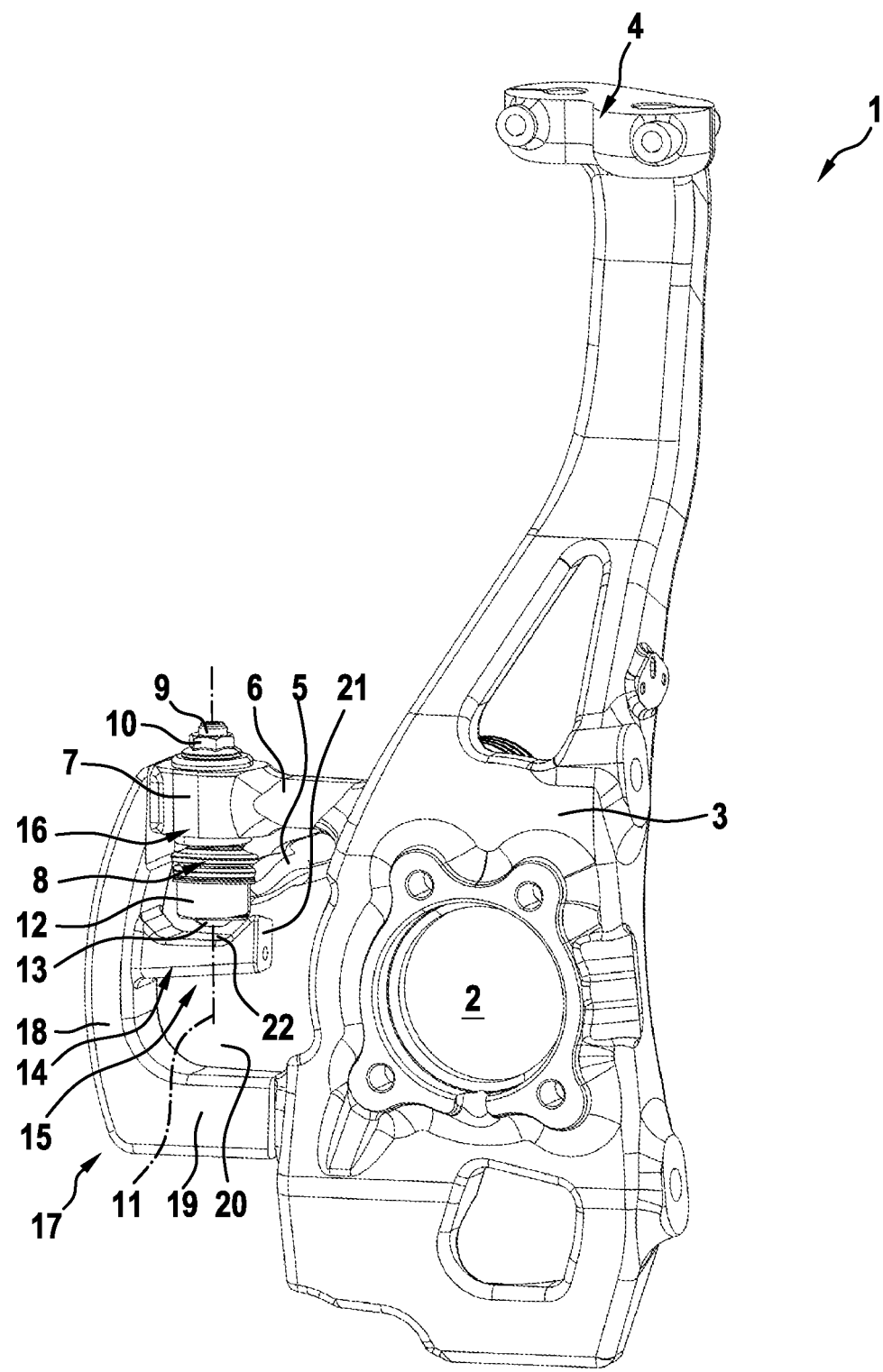

WHEEL SUPPORT FOR A MOTOR VEHICLE

FIELD

The disclosure relates to a wheel support for a motor vehicle, comprising a main part and a track lever extending from the main part for attaching a track rod via a track rod joint, wherein the track rod joint is fixed or can be fixed to the track lever at an attachment point by means of a pin on one side of the track lever. The disclosure further relates to a method for mounting a wheel support for a motor vehicle.

BACKGROUND

For example, the publication DE 40 17 210 C1 is known from the prior art. This disclosure relates to a steerable motor vehicle axle with a torsion bar stabilizer, the torsion bar of which is held on the body side and the cranked end pieces of which are each fastened via an articulated connection to the lower end of a connecting arm, the upper end of which is hinged on the wheel support in the steering axis of the respective wheel. According to the invention, the connecting arm is pivoted about the steering axis in the same direction as the wheel support and against a flexible, restoring support seated in the connection of the torsion bar stabilizer to the connecting arm during a movement of the wheel support.

SUMMARY

The object of the invention is to propose a wheel support for a motor vehicle which has advantages over known wheel supports, in particular ensuring reliable and safe attachment of the track rod.

According to the invention, this is achieved with a wheel support for a motor vehicle. According to the disclosure, a holding protrusion which covers the attachment point forms a securing means for the track rod on the wheel support.

The wheel support is used to rotatably mount at least one wheel on a body of the motor vehicle. Preferably, the wheel support is part of a wheel suspension, which is used for the suspension, in particular the resilient suspension, of the wheel with respect to the body. The wheel is rotatably mounted on the wheel support of the wheel bearing assembly. To this end, the wheel can preferably be fixed to a wheel hub, the wheel hub ultimately being rotatably mounted on the wheel support by means of a wheel bearing. The wheel support has, for example, a wheel bearing socket which is configured as an opening, in particular as a closed-edged opening, in the wheel support or the main part thereof.

The wheel bearing is disposed in the wheel bearing socket. In addition, the wheel hub and/or a shaft connected to it in a rotationally fixed manner at least partly engages the wheel bearing socket. More preferably, the wheel hub and/or the shaft, in particular jointly, penetrate the wheel bearing socket in the axial direction in relation to an axis of rotation of the wheel hub, at least partially, in particular entirely. The wheel bearing is more preferably configured as a rolling bearing and, as such, has an inner ring and an outer ring, between which rolling elements are disposed to reduce friction.

Preferably, the inner ring is associated with the wheel hub, in particular connected to the wheel hub, for example configured integral therewith or fixed thereto, whereas the outer ring is associated with the wheel support, in particular connected to the wheel support, for example fixed to it. Preferably, the outer ring is located in the wheel bearing socket. In other words, the outer ring abuts with its outer peripheral surface on an inner peripheral surface of the wheel support that defines the wheel bearing socket.

Preferably, the wheel support is connected to the body via at least one suspension link. Thus, the suspension link engages the body on one side and the wheel support on the other side, in particular so as to be respectively pivotable. The suspension link is, for example, provided in the form of a transverse link. However, a configuration as a trailing link is also possible. In general, the wheel support is attached via the at least one suspension link. Preferably, a plurality of suspension links for attaching the wheel support to the body is provided, though. In particular, the suspension link is provided in the form of a two-point link, a three-point link or similar. If the wheel support is attached via a plurality of suspension links, each of these suspension links can be designed as a two-point link or as a wishbone.

The wheel support has at least the main part and the track lever extending from the main part in the form of a protrusion. The main part and the track lever are preferably configured integral with each other and/or of uniform material. The track lever is used to hinge or attach the track rod, via which a steering movement is transmitted to the wheel support. The track rod engages the attachment point at the track lever, wherein the attachment point is spaced apart from an axis of rotation of the wheel support about which the wheel support is rotatably supported with respect to the body. In this way, a lever stroke is generated, via which a linear movement of the track rod is converted into a rotary movement of the wheel support.

The track rod is pivotally hinged to the track lever, namely via the track rod joint. Relative to the track lever, the track rod joint is located relative to an axis of rotation of the track rod joint or an axis of rotation of the track rod, next to the track lever in the axial direction. In the installed position of the wheel support, the track rod joint, and therefore the track rod, are disposed above or below the track lever. Preferably, the track rod has a bearing element which engages a bearing housing which is fixed or can be fixed to the track lever to form the track rod joint.

The track rod joint or the bearing housing is fixed by means of the pin which, for this purpose, at least partially penetrates a recess formed in the track lever. For example, the track rod joint or the bearing housing is provided, in the axial direction relative to the axis of rotation of the track rod joint, on one side of the track lever and a nut for fixing the track rod joint to the track lever is provided on the other side of the track lever. In this respect, the pin entirely penetrates the track lever in the axial direction. On one side of the track lever, the track rod joint is fixed or can be fixed to the track lever at the attachment point. This means that the track rod joint is disposed next to the track lever, in the axial direction relative to a longitudinal centre axis of the pin, for example, abutting on the track lever or spaced apart therefrom in the axial direction in relation to a longitudinal centre axis of the pin.

If, for example, the track rod joint is damaged, the track rod may become detached from the track lever, for example by the bearing element moving out of the bearing housing. In this case, steering of the motor vehicle would no longer be possible. For this reason, the securing means for the track rod formed by the holding protrusion is provided. The holding protrusion covers the attachment point in such a way that the track rod is prevented from becoming detached from the track lever, namely in the axial direction in relation to the axis of rotation of the track rod joint. Thus, for example, the holding protrusion effectively prevents the bearing element from moving out of the bearing housing.

Since the pin usually remains intact even if the track rod joint is damaged, it fixes the track rod to the track lever in the radial direction with respect to the axis of rotation of the track rod joint. Therefore, the pin can continue to transmit a force from the track rod to the track lever or vice versa. At the same time, the holding protrusion prevents the track rod from becoming detached from the pin. For example, the track rod at least partially, in particular entirely, surrounds the pin in the circumferential direction in relation to the axis of rotation. As a result, the track rod is fixed to the pin in the radial direction in relation to the axis of rotation, but not in the axial direction. Without the securing means, the track rod could, thus, slide off of the pin. Such sliding off would, however, be prevented by means of the holding protrusion forming the securing means.

More preferably, the holding protrusion is arranged in such a way that it fixes the track rod with respect to the track lever providing a clearance in the axial direction. While this prevents the track rod from becoming detached from the track lever, the track rod may, however, move with respect to the track lever in the axial direction during a driving operation of the motor vehicle. Such a movement causes noise and/or vibrations as the track rod hits the track lever and/or the holding protrusion. Thus, an acoustic and/or haptic indicator is implemented for a user of the motor vehicle indicating a defect of the track rod joint. In particular, the haptic indicator can be perceived by the user via a steering wheel of the motor vehicle. In other words, although the securing means or the holding protrusion enables a displacement of the track rod with respect to the track lever in the axial direction, it prevents complete detachment of the track rod from the track lever. Thus, a loss of a wheel suspension is reliably prevented.

According to a further embodiment of the invention, the holding protrusion is spaced apart from the track lever and/or the main part. The holding protrusion is fixed with respect to the main part and/or the track lever, but is spaced apart from at least the track lever or the main part. For example, the holding protrusion is parallel or at least approximately parallel to the track lever. Therefore, an imaginary longitudinal centre axis of the holding protrusion is parallel to an imaginary longitudinal centre axis of the track lever or encloses an angle therewith which is greater than 0° and less than 90°. Preferably, the angle is greater than 0° and corresponds to at most 5°, at most 4°, at most 3°, at most 2° or at most 1°. Additionally or alternatively, the holding protrusion is spaced apart from the main part. Preferably, it is fixed to the main part via an additional element. Such a configuration enables easy and reliable mounting of the track rod joint on the wheel support.

According to a further preferred embodiment of the invention the holding protrusion is releasably fixed. This means that the holding protrusion is fixed to the main part and/or the track lever without causing any damage and in a reversible manner, that is to say, it can be both fixed thereto and detached therefrom without causing any damage. This significantly simplifies assembly and, in particular, replacement of the track rod joint.

According to a further development of the invention, the holding protrusion extends from the main part or a bracket which is fixed on one side or on both sides to the main part and/or to the track lever. Therefore, the holding protrusion can be fixed directly to the main part and, thus, can extend therefrom. In this case, it is preferably spaced apart from the track lever. According to a more preferred embodiment, however, the holding protrusion extends from the bracket, which is in turn fixed to the main part or to the track lever.

In other words, the holding protrusion is connected only indirectly to the main part or to the track lever.

According to the invention, the bracket may be fixed to the main part and/or to the track lever on one side only or, preferably, on both sides. In the case of one-sided fixing, the bracket is preferably fixed to the track lever only, whereas it is spaced apart from the main part. A configuration in which the bracket is fixed directly to the main part, that is to say extends therefrom, and is spaced apart from the track lever can also be implemented. More preferably, the bracket is fixed to the main part on one side and to the track lever on the other side. In this way, a particularly high rigidity of the bracket and of the wheel support is achieved. The bracket can be fixed by means of a screw fastening comprising one or more screws.

Disposing the holding protrusion on the main part allows for a particularly simple configuration of the wheel support, whereas disposing the holding protrusion on the bracket may increase the motor vehicle's accident safety. In this case, the bracket is preferably configured such that in the event of a frontal impact of the motor vehicle with an obstacle with a so-called "small overlap", the wheel of the motor vehicle is deflected or supported. Thus, the wheel cannot turn inwards. Such a configuration combines a high degree of accident safety of the motor vehicle with the advantageous effect of the holding protrusion.

According to a further preferred embodiment of the invention, a closed-edged recess is formed in cross-section resulting from the two-sided fixing of the bracket, which is jointly defined by the main part, the track lever, and the bracket. This provides a large effective support surface for the wheel of the motor vehicle with little use of material, which provides a large lever arm for supporting the wheel as it extends in the same direction as the track lever. The two-sided fixing of the bracket engaging both the main part and the track lever for this purpose achieves a high rigidity providing the advantages associated therewith in the event of an accident of the motor vehicle.

According to a more preferred further development of the invention, the track lever has a bearing eye for attaching the track rod joint, wherein the bracket is attached to the bearing eye on the side facing away from the main joint. The bearing eye is formed by a thickening of the track lever in at least one direction, in which a passage opening is formed for the pin. Thus, the bearing eye completely surrounds the pin in the circumferential direction after the track rod joint has been mounted on the track lever.

The bracket then engages the bearing eye on the side facing away from the main part. Accordingly, it is fixed directly to the bearing eye, for example by means of the screw connection mentioned hereinbefore. This means that the track lever is used in an advantageous manner for spacing at least one portion of the bracket apart from the main part of the wheel support. Thus, no separate protrusion is needed on the main part to attach the bracket. This enables a weight-reduced configuration of the wheel support.

According to a further embodiment of the invention, the bracket has at least one first leg and a second leg extending at an angle from the first leg, wherein the holding protrusion extends from the first leg and is spaced apart from the second leg. The bracket is generally configured in an essentially L-shaped form and has the first leg and the second leg for this purpose. The two legs extend directly from one another and are preferably configured integral with each other and/or of uniform material.

For example, the two legs, i.e. the first leg and the second leg, each merge into each other at one end. To this end, the two legs abut on each other at an angle which is greater than 0° and less than 180°. For example, the angle is at least 45° and at most 135°, at least 60° and at most 120°, at least 75° and at most 105°, at least 80° and at most 100°, at least 85° and at most 95° or approximately or exactly 90°.

Similar to the second leg, the holding protrusion extends from the first leg, but it is spaced apart from the second leg. For example, the holding protrusion is parallel or at least approximately parallel to the second leg. Preferably, the holding protrusion is located approximately centrally on the first leg. Such a configuration of the bracket is on the one hand easy to manufacture and can on the other hand be easily mounted on the main part or the track lever.

According to a more preferred embodiment of the invention, the holding protrusion has a free end and extends towards the track lever in the direction of the free end such that, as viewed in cross-section, a holding recess is formed in the holding protrusion, which contributes to forming the securing means. The holding protrusion has the free end on its end facing away from the first leg, which is preferably spaced apart from the main part. The holding protrusion extends in the direction of its free end towards the track lever, for example caused by a corresponding bending of the holding protrusion or due to a thickening of the holding protrusion.

Thus, a holding recess is provided in the holding protrusion between the first leg and the free end of the holding protrusion contributing to forming the securing means and serving to receive a portion of the track rod in the event the track rod becomes detached from the track lever. In addition to the holding protrusion extending towards the track lever in the direction of the free end, it can be provided that the holding protrusion also extends in the opposite direction towards the track lever, for example caused by a corresponding bending of the holding protrusion or a thickening.

In this case, the holding recess is located between two such bendings or thickenings such that the holding protrusion is symmetrical or at least nearly symmetrical in at least one direction, for example with respect to a plane intersecting the holding protrusion between the first leg and the free end. Thus, the plane is spaced apart from the first leg of the bracket. The configuration of the wheel support described above provides a particularly reliable catching of the track rod in the event of a defect of the track rod joint.

According to a further preferred embodiment of the invention, a distance, in a specific direction, between the track rod joint mounted as intended and the holding projection can be smaller than dimensions of a bearing housing receiving a bearing element of the track rod and/or of the bearing element in the same direction. After the track rod joint has been mounted as intended, it is located at a specific distance from the holding protrusion, in particular in the axial direction in relation to the axis of rotation of the track rod joint. The bearing housing or the bearing element has dimensions, in the same direction, which are greater than the distance, in particular significantly greater. For example, the distance is at most 75%, at most 50%, at most 25% or at most 10% of the dimensions. In this way, the track rod becoming detached from the track lever due to a defect is reliably prevented.

The invention further relates to a method for mounting a wheel support for a motor vehicle, in particular a wheel support according to the embodiments included in this description, wherein the wheel support has a main part and a track lever extending from the main part for attaching a track rod via a track rod joint, wherein the track rod joint is fixed to the track lever at an attachment point by means of a pin on one side of the track lever. According to the invention, a holding protrusion which covers the attachment point is disposed on the wheel support to form a securing means for the track rod.

The advantages of such a configuration of the wheel support or of such a procedure have already been pointed out. According to the embodiments included in this description, both the wheel support and the method for the mounting thereof can be further developed so that reference is made thereto.

BRIEF DESCRIPTION OF THE DRAWINGS

The embodiments of the invention are explained in more detail below with reference to the exemplary embodiments shown in the drawing, without limiting the invention. The one FIG. 1 shows a schematic illustration of a wheel support for a motor vehicle with a securing means for a track rod.

DETAILED DESCRIPTION

The FIGURE shows a wheel support 1 for a motor vehicle, by means of which a wheel of the motor vehicle can be attached to a body of the motor vehicle. For example, the wheel support 1 is attached to the body via at least one link, whereas the wheel or a wheel hub to which the wheel can be attached is rotatably supported on the wheel support 1 via a wheel bearing. The wheel support 1 has a wheel bearing socket 2 which is formed in a main part 3 of the wheel support 1 to receive the wheel bearing. As shown herein, the wheel bearing socket 2 is preferably provided in a closed-edged configuration. The main part 3 has an interface 4 for attaching a damper, a suspension or a strut.

A track lever 6 extends from the main part 3 for attaching a track rod 5 and is provided in the form of a protrusion on the main part 3. A bearing eye 7 for attaching the track rod 5 is formed on the track lever 6. The track rod 5 is attached to the track lever 6 by means of a track rod joint 8 which is fixed to the track lever 6 via a pin 9 and a nut 10. For this purpose, the pin 9 penetrates a recess of the bearing eye 7 provided for this purpose. The track rod 5 is rotatably mounted about an axis of rotation 11 with respect to the track lever 6 via the track rod joint 8. The track rod joint 8 has a bearing housing 12 in which a bearing element (not shown here) of the track rod 5 is rotatably mounted. The bearing element is, for example, provided in the form of a ball or the like such that the track rod joint 8 is configured as a ball joint.

The bearing housing 12 is closed by means of a bearing cover 13 on one side and, for example, rolled closed on the other side. In any case, the bearing housing 12 is configured in such a way that the bearing element cannot escape therefrom when operated properly. To prevent loss of the motor vehicle wheel guide if the bearing element unintentionally gets out of the bearing housing 12, i.e. in the event of a defect of the track rod joint 8, a holding protrusion 14 is provided which forms a securing means 15 for the track rod 5. For this purpose, the holding protrusion 14 covers an attachment point 16 at which the track rod joint 8 is fastened to the track lever 6 by means of the pin 9.

For example, the attachment point 16 is located on the axis of rotation 11. The holding protrusion 14 extends from a bracket 17 which, in the exemplary embodiment illustrated here, is fixed to the main part 3 on one side and to the track lever 6 on the other side. The bracket 17 has a first leg 18 and a second leg 19 which are at an angle relative to one another. The second leg 19 extends from the first leg 18 and extends from the latter towards the main part 3. Preferably, the second leg 19 abuts on the main part 3 and is additionally fastened thereto, for example by means of a screw fastening.

The first leg 18, on the other hand, is continuously spaced apart from the main part 3. However, it is fixed to the track lever 6, more precisely, it engages the bearing eye 7 on the side thereof facing away from the main part 3. It is apparent that the two legs 18 and 19 together with the main part 3 and the track lever 6 define a recess 20 in an closed-edged manner. This enables a weight-saving configuration of the wheel support 1. The holding protrusion 14 has a free end 21 on the side facing away from the first leg 18. It extends towards the track lever 6, in the direction of this free end 21, namely in the form of a thickening of the holding protrusion 14. This thickening defines a holding recess 22 which contributes to forming the securing means 15.

When mounting the wheel support 1, the track rod 5 is hinged to the track lever 6 via the track rod joint 8 with the bracket 17 removed from the main part 3. Only then, the bracket 17 is mounted and fixed to the main part 3 on one side and to the track lever 6 on the other side. As a result, the holding protrusion 14 is disposed in such a way as to overlap with the attachment point 16 forming the securing means 15 for the track rod 5. Preferably, the holding protrusion 14 is disposed in such a way that it is located at a (minimum) distance from the track rod joint 8 which is smaller than the dimensions of the bearing housing 12 and/or of the bearing element in the axial direction in relation to the axis of rotation 11. As a result of such an arrangement of the holding protrusion 14, the bearing element is reliably prevented from slipping out of the bearing housing 12.

The invention claimed is:

1. A wheel support for a motor vehicle, comprising:
a main part and a track lever extending from the main part for attaching a track rod via a track rod joint, wherein the track rod joint is fixed or can be fixed to the track lever at an attachment point by a pin on one side of the track lever wherein a holding protrusion which covers the attachment point forms a securing means for the track rod on the wheel support.

2. The wheel support according to claim 1, wherein the holding protrusion is spaced apart from the track lever and/or the main part.

3. The wheel support according to claim 2, wherein the holding protrusion extends from the main part or a bracket which is fixed to the main part and/or to the track lever on one side or both sides.

4. The wheel support according to claim 2, further comprising a bracket fixed to at least one of the main part and the track lever on both sides of said bracket, comprising a two-sided fixing of the bracket, wherein a closed-edged recess is formed in cross-section resulting from the two-sided fixing of the bracket, which is jointly defined by the main part, the track lever, and the bracket.

5. The wheel support according to claim 2, wherein the track lever has a bearing eye for attaching the track rod joint, wherein the bracket is fixed to the bearing eye on the side facing away from the main part.

6. The wheel support according to claim 2, wherein the bracket has at least one first leg and a second leg extending from the first leg at an angle, wherein the holding protrusion extends from the first leg and is spaced apart from the second leg.

7. The wheel support according to claim 1, wherein the holding protrusion is releasably fixed.

8. The wheel support according to claim 7, wherein the holding protrusion extends from the main part or a bracket which is fixed to the main part and/or to the track lever on one side or both sides.

9. The wheel support according to claim 7, further comprising a bracket fixed to at least one of the main part and the track lever on both sides of said bracket, comprising a two-sided fixing of the bracket, wherein a closed-edged recess is formed in cross-section resulting from the two-sided fixing of the bracket, which is jointly defined by the main part, the track lever, and the bracket.

10. The wheel support according to claim 7, wherein the track lever has a bearing eye for attaching the track rod joint, wherein the bracket is fixed to the bearing eye on the side facing away from the main part.

11. The wheel support according to claim 1, wherein the holding protrusion extends from the main part or a bracket which is fixed to the main part and/or to the track lever on one side or both sides.

12. The wheel support according to claim 11, wherein the holding protrusion extends from the bracket and wherein the bracket is fixed on both sides, comprising a two-sided fixing of the bracket, wherein a closed-edged recess is formed in cross-section resulting from the two-sided fixing of the bracket, which is jointly defined by the main part, the track lever, and the bracket.

13. The wheel support according to claim 11, wherein the track lever has a bearing eye for attaching the track rod joint, wherein the bracket is fixed to the bearing eye on the side facing away from the main part.

14. The wheel support according to claim 1, further comprising a bracket fixed to at least one of the main part and the track lever on both sides of said bracket, comprising a two-sided fixing of the bracket, wherein a closed-edged recess is formed in cross-section resulting from the two-sided fixing of the bracket, which is jointly defined by the main part, the track lever, and the bracket.

15. The wheel support according to claim 14, wherein the track lever has a bearing eye for attaching the track rod joint, wherein the bracket is fixed to the bearing eye on the side facing away from the main part.

16. The wheel support according to claim 1, wherein the track lever has a bearing eye for attaching the track rod joint, wherein the bracket is fixed to the bearing eye on the side facing away from the main part.

17. The wheel support according to claim 1, wherein the bracket has at least one first leg and a second leg extending from the first leg at an angle, wherein the holding protrusion extends from the first leg and is spaced apart from the second leg.

18. The wheel support according to claim 1, wherein the holding protrusion has a free end and extends towards the track lever in the direction of the free end, such that, as viewed in cross-section, a holding recess is formed in the holding protrusion, which contributes to forming the securing means.

19. The wheel support according to claim 1, wherein a distance, in a specific direction, between the track rod joint mounted as intended and the holding protrusion can be smaller than dimensions of a bearing housing receiving a bearing element of the track rod and/or of the bearing element in the same direction.

20. A method for mounting a wheel support for a motor vehicle, said wheel support comprising a main part and a track lever extending from the main part, wherein the method of mounting said wheel support comprises:

attaching a track rod to the track rod lever via a track rod joint,
fixing the track rod joint to the track lever at an attachment point by a pin on one side of the track lever, and
disposing a holding protrusion which covers the attachment point on the wheel support to form a securing means for the track rod.

* * * * *